Figure 1:
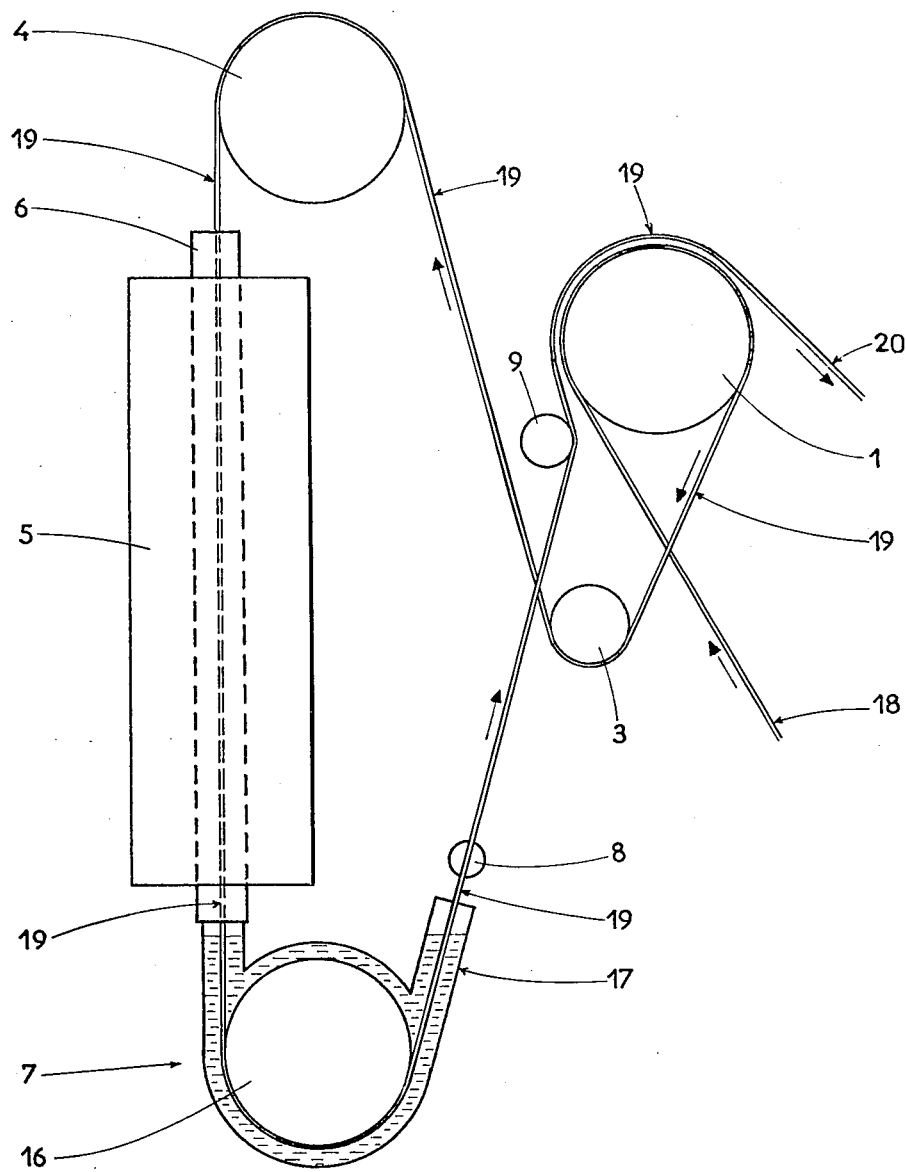

United States Patent [19]

Moreau

[11] 4,118,617
[45] Oct. 3, 1978

[54] PROCESS AND APPARATUS FOR CONTINUOUS HEAT TREATMENT OF METALLIC WIRES AND BANDS

[75] Inventor: Marc Moreau, Asnieres, France

[73] Assignee: Trefimetaux, Paris, France

[21] Appl. No.: 622,704

[22] Filed: Oct. 15, 1975

[30] Foreign Application Priority Data

Oct. 18, 1974 [FR] France .................................. 74 40560

[51] Int. Cl.² .............................................. H05B 5/08
[52] U.S. Cl. ............................. 219/10.61 R; 219/155; 266/112
[58] Field of Search ............... 148/154, 155, 156, 153; 219/10.61, 155; 266/112

[56] References Cited

U.S. PATENT DOCUMENTS

| 2,459,507 | 1/1949 | Denham | 219/10.61 X |
| 3,328,554 | 6/1967 | Biskeborn | 219/10.61 |
| 3,335,260 | 8/1967 | Ferschl | 219/155 |
| 3,515,848 | 6/1970 | Heinz | 219/155 |

Primary Examiner—E. A. Goldberg

[57] ABSTRACT

The invention relates to a process and an apparatus for the continuous heat treatment of metallic wires and bands. In the process according to the invention, the wire or band to be treated is passed around the base of the groove of a pulley and is annealed by induction heating. The treated wire or band is then cooled and re-enters the groove of the pulley above the wire or band to be treated. The invention is intended for the continuous treatment of metallic wires or bands.

4 Claims, 2 Drawing Figures

PROCESS AND APPARATUS FOR CONTINUOUS HEAT TREATMENT OF METALLIC WIRES AND BANDS

This invention relates to a process and an apparatus for the continuous heat treatment of metallic wires and bands.

The process and apparatus according to the invention are particularly intended for the heat treatment of wires and bands of aluminum or one of its alloys, copper or one of its alloys or even stainless steel.

The heat treatments in question comprise a heating phase, followed by cooling. The heat treatment may be an annealing or quenching treatment, depending upon the type of metal, the heating temperature and the cooling rate.

It is known that thin products, i.e., wires and bands, can be continuously treated by Joule effect. The heating current is introduced between two pulleys over which the thin product is guided.

It is also known that wires and bands can be continuously treated by induction heating. In this case, the heating current is an alternating current generated by the passage of the thin product through an inductor in the form of a sleeve along whose axis the product to be treated is guided. Accordingly, the current flows along the axis of the product, provided that the product is arranged in the form of a loop closed by an electrical contact, thus forming a short-circuit coil forming the secondary winding of a transformer of which the inductor represents the primary winding.

It is known that the secondary loop formed by the product can be electrically closed by passing the product over electrically interconnected pulleys. These pulleys may optionally be coaxial.

In cases where it is used for the treatment of wires or bands of aluminum, this process has the disadvantage of causing rapid deterioration of the contact surfaces of the pulleys and, hence, damage to the product, at the same time as an irregular distribution of the current in the product to be treated.

It is known that this disadvantage can be obviated by establishing direct electrical contact between the product to be heat-treated and the treated product. In this case, the cold product to be treated passes over the hot, treated wire.

One disadvantage of this process arises out of the fact that the treated product, which is hot, is elongated by thermal expansion and winds itself around the base of the pulley groove, whereas the product to be treated, which is cold and not expanded, has to wind itself around the treated product, i.e., around a larger radius, thereby imposing a higher linear speed. Accordingly, it is necessary to provide for relative sliding between the two products, which is accomplished by limiting the winding arc of the product to be treated. However, the length of the electrical contact is reduced, which gives rise to a serious disadvantage attributable to the extreme intensity of the current flowing through the product. In addition, the relative sliding movement damages the surface of the product.

A second disadvantage of this process concerns the treatment of wires and arises out of the fact that, on completion of heating, the wire has a high temperature which, in some cases, is close to its melting temperature. Under these conditions, any local overheating, arising out of the flow of current from one wire to the other, across the only contact generatrix, results in the formation of sparks and fustion craters.

The present invention relates to a process for the continuous heat treatment of metallic wires and bands which obviates these disadvantages.

The invention also relates to an apparatus for carrying out this process.

In the process according to the invention, the thin product, i.e., the wire or band, is treated by induction heating and a closed loop is formed by guiding the treated wire and the untreated wire over the base of the same pulley. The heated wire is cooled before passing over the untreated wire in the pulley groove.

The apparatus according to the invention comprises an inductor, a pulley with a deep groove and a cooler. The wire to be treated travels over the base of the pulley groove before and after passing through the inductor. The cooler is arranged between the inductor outlet and the pulley, the treated wire traveling over the untreated wire entering the inductor inside the pulley groove.

Figure 2:
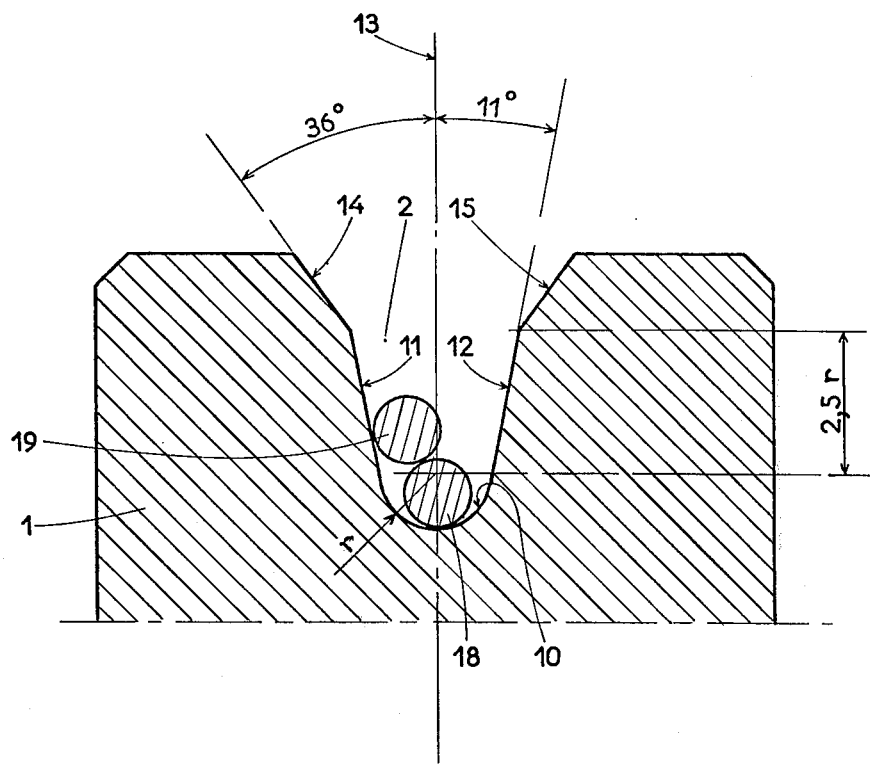

One embodiment of the invention is described by way of example in the following with reference to the accompanying drawings, wherein:

FIG. 1 diagrammatically illustrates one example of a continuous annealing apparatus; and FIG. 2 is a cross-section of the rim of the deep groove pulley.

In the drawings, the same components are denoted by the same reference numerals.

The apparatus is intended for the continuous annealing of wires. It comprises a pulley 1 with a deep groove 2, a first return pulley 3, a second return pulley 4, an inductor 5 equipped with a steam-filled protection tube 6, which is used in the case of copper wire, a cooler 7, a compressed-air dryer 8 and a third return pulley 9.

The cross-section of the groove 2 of the pulley 1 has the from illustrated in FIG. 2. The base 10 is formed by a circle of radius "r" followed, at a height equal to 2.5 r, by two tangents 11 and 12 which form an angle of 11° with the axis 13 of the cross-section. At the upper part of the groove, these two tangents are replaced by two straight-line segments 14 and 15 which form an angle of 36° with the same axis 13 and which open towards the outside. The groove, which is used to guide the wire and not to carry electrical current, may be made of a substantially non-conductive or even insulating material, such as stainless steel, carbides, ceramics. This groove form can be used for treating a wire with a radius between 0.6 r and 4. Wires with very different diameters may be treated with the same apparatus by replacing the deep groove, either by providing the pulley with several grooves having different radii, or by insuring that the rim or the pulley itself are readily replaceable.

In the annealing of copper wire, steam is passed through the protection tube 6.

The cooler 7 comprises a pulley 16 accommodated in a housing 17 through which flows a cooling fluid, generally water.

In the interests of clarity, the wire has been denoted in the figures with three different reference numerals according to whether it is in the cold-worked state before annealing (18), or whether it is undergoing the annealing treatment (19) or whether it is in the annealed state (20). It arrives in the cold-worked state 18 from the wire-drawing machine and travels over the base of the groove 2 of the pulley 1 in a large arc, of the order of 270°. The annealing process begins and the wire 19 being treated travels over the return pulleys 3 and 4, enters the inductor 5 and then passes successively into the cooler 7 on the pulley 16, where it is cooled, and then into the dryer 8 where it is dried. Finally, after traveling around the return pulley 9, the wire re-enters the groove 2 of the pulley 1 over approximately 180° above the cold wire 18, and then leaves the apparatus in the form of annealed wire 20.

The wires 18 and 20 come into contact with one another over a large arc which, since the pulley has a large diameter, provides for excellent electrical contact, hence the absence of sparks and local overheating. In addition, since the wires 18 and 20 are cold, the linear speed of the annealed wire 20 is hardly different from that of the wire 18 to be annealed, which is not reflected in relative sliding of the wires, but instead in slight elongation of the wire 19 in the annealing zone, which is favorable to its good mechanical tension and improves electrical contact with the wire 18. The speed at which the wire travels over the pulleys is constant so that the annealing level is extremely stable due to the absence of sliding.

In one particular exemplary embodiment, wires from 0.3 to 1.78 mm in diameter are treated with a 200 mm diameter grooved pulley at speeds of up to 1500 meters per minute.

The embodiment described by way of example above relates to the continuous annealing treatment of a wire. The same apparatus may be used for a quenching treatment by regulating the heating temperature and the cooling rate.

The apparatus may also be used for the treatment of bands. In that case, the pulley 1 has a groove of which the base comprises a wide, straight cross-section.

The invention is intended for the continuous heat treatment of metallic wires.

I claim:

1. A process for the continuous heat treatment of thin metallic wires and bands by induction heating in a closed loop established between the untreated and the heat treated product, in which the product to be treated passes successively over the base of a circular base deep groove of a first pulley, on a first return pulley, in the inductor, into a cooler, on a second return pulley and again in the deep groove of the first pulley in superposed relation with the untreated product without relative sliding of the products, the loop being electrically closed by the non-sliding contact between the untreated and the heat treated product.

2. A process as claimed in claim 1, in which the treated and cooled products pass into a dryer.

3. Apparatus for the continuous heat treatment of thin metallic wire and band members by induction heating in a closed loop established between the untreated and heat treated members comprising induction means for heating the members to be treated, a first pulley member having a deep groove in the periphery thereof, said deep groove defining a circular base, a return pulley, cooling means, and means for guiding the metallic wire and band members to be treated successively over said circular base of said first pulley, through said induction means, through said cooling means, over said return pulley and again over said deep groove of said first pulley in superposed relation with the untreated product without relative sliding of the treated and untreated wire and band members.

4. Apparatus as claimed in claim 3 which includes means for drying the cooled wire and band members.

* * * * *